(12) United States Patent
Garbiso

(10) Patent No.: US 6,786,494 B2
(45) Date of Patent: Sep. 7, 2004

(54) VEHICLE HARDTOP CARRIER

(76) Inventor: Michael J. Garbiso, 15058 Sierra Bonita La., Chino, CA (US) 91710

( * ) Notice: Subject to any disclaimer, the term of this patent is extended or adjusted under 35 U.S.C. 154(b) by 0 days.

(21) Appl. No.: 09/921,859

(22) Filed: Aug. 1, 2001

(65) Prior Publication Data
US 2002/0020978 A1 Feb. 21, 2002

Related U.S. Application Data
(60) Provisional application No. 60/224,957, filed on Aug. 11, 2000.

(51) Int. Cl.⁷ .................................................. B62B 3/10
(52) U.S. Cl. ..................... 280/38; 280/35; 280/646; 280/79.7; D34/17; D34/23
(58) Field of Search .................. 280/79.3, 39, 79.11, 280/646, 42, 38, 79.4, 79.7, 641, 642, 645, 40, 35; 211/195; 248/166, 129, 150; D34/17, 23, 24

(56) References Cited

U.S. PATENT DOCUMENTS

| | | | | | |
|---|---|---|---|---|---|
| 2,716,557 | A | * | 8/1955 | Gould et al. ................. | 280/659 |
| 4,346,906 | A | * | 8/1982 | Thorpe ................... | 280/33.996 |
| 4,456,273 | A | * | 6/1984 | McKinnon ............. | 280/33.996 |
| 4,572,531 | A | * | 2/1986 | Elia ............................ | 280/62 |
| 4,830,386 | A | * | 5/1989 | Snoke et al. .................. | 280/38 |
| D303,031 | S | * | 8/1989 | Ellis ............................ | D34/31 |
| D304,118 | S | * | 10/1989 | Snoke et al. .................. | D34/31 |
| 4,984,814 | A | * | 1/1991 | Graffunder ................... | 280/35 |
| 5,221,066 | A | * | 6/1993 | Ferrigan et al. ............ | 248/166 |
| 5,296,030 | A | * | 3/1994 | Young ........................ | 118/500 |
| 5,299,659 | A | * | 4/1994 | Imbeault et al. ............ | 414/592 |
| 5,335,923 | A | * | 8/1994 | Langenback et al. ..... | 280/79.11 |
| 5,445,279 | A | * | 8/1995 | Warner ....................... | 211/195 |
| 5,660,637 | A | * | 8/1997 | Dodge ........................ | 118/500 |
| 5,707,450 | A | * | 1/1998 | Thompson .................. | 118/500 |
| 5,762,348 | A | * | 6/1998 | Echternacht ............... | 280/79.7 |
| 5,810,548 | A | * | 9/1998 | Stenudd ...................... | 414/680 |
| 6,019,235 | A | * | 2/2000 | Ferrigan ..................... | 211/195 |
| 6,105,797 | A | * | 8/2000 | Haisma ................... | 211/130.1 |
| 6,116,533 | A | * | 9/2000 | Elder ....................... | 242/594.4 |
| 6,173,947 | B1 | * | 1/2001 | Johnson ....................... | 269/17 |
| 6,217,045 | B1 | * | 4/2001 | Leyton ...................... | 280/79.7 |
| 6,234,432 | B1 | * | 5/2001 | Piller et al. ................ | 248/129 |
| 6,338,758 | B1 | * | 1/2002 | Curran ....................... | 118/500 |

* cited by examiner

Primary Examiner—Brian L. Johnson
Assistant Examiner—J. Allen Shriver
(74) Attorney, Agent, or Firm—Boniard I. Brown

(57) ABSTRACT

A vehicle hardtop carrier has a rear wheels bar transversely of a mounting bar, and front wheels on separate wheel bars support the hardtop and are adjustably pivotally mounted on the mounting bar to accommodate various hardtops. A cushion bar extends generally upwardly from the mounting bar to support the hardtop. A retaining strap extends from the carrier and about the hardtop.

15 Claims, 1 Drawing Sheet

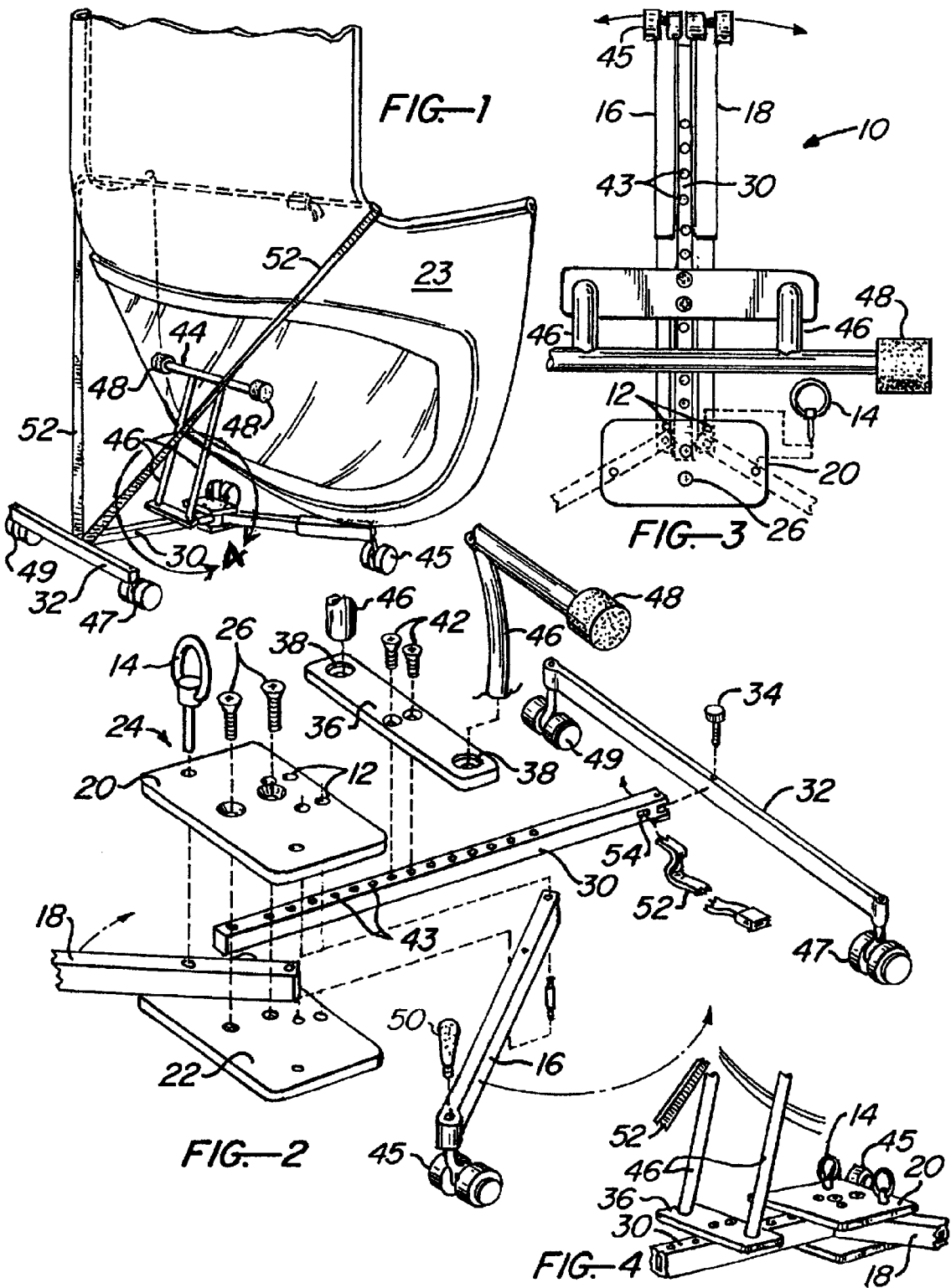

VEHICLE HARDTOP CARRIER

RELATED APPLICATIONS

Reference is made to my Provisional Application No. 60/224,957, filed Aug. 11, 2000, entitled "Vehicle Hardtop Carrier".

BACKGROUND AND SUMMARY OF THE INVENTION

A vehicle hardtop carrier provides for convenient handling and movement of a vehicle hardtop while protecting it against damage, as during removal of the top and later replacement during portions of a travel itinerary. The carrier is portable when compacted or folded and may be disposed in a convenient carrying bag.

The hardtop carrier provides convenience and ease of transport of the hardtop into and out of hotel rooms, in elevators, etc., and it can be handled in a typical luggage carrier. The hardtop carrier is useful with any vehicle having a demountable hardtop, including Mercedes Benz, Corvette, Porsche, Mazeratti, BMW, etc.

The problem is presented of the handling and storage of a hardtop when not disposed on the vehicle. It is desired that the hardtop be protected against damage, as by scratching, denting, etc., while not mounted on the vehicle. This is a particular problem when the vehicle is not located at its usual garage facility, as when the vehicle is engaged in traveling, staying overnight at a hotel, etc.

The present invention provides a hardtop carrier which is relatively easily and quickly deployed for use, and which is quickly and easily retracted and compacted when not in use. Thus two minutes are typically required in compacting or deploying the carrier when the user is not involved with screws or other fasteners, and is not required to utilize any tool for deploying or retracting the apparatus.

The apparatus of the invention is adjustable to accommodate the different vehicle hardtops by simple adjustment.

BRIEF DESCRIPTION OF THE DRAWINGS

FIG. 1 is a perspective view of the vehicle hardtop carrier of the invention;

FIG. 2 is an exploded perspective view of the carrier of FIGS. 1 and 2;

FIG. 3 is a top view of the carrier of FIG. 1 in retracted, compacted configuration; and FIG. 4 is an enlarged view of the portion of FIG. 1 encircled by arrow 4.

DESCRIPTION OF THE PREFERRED EMBODIMENT

Referring to the drawings, a preferred embodiment of the invention is shown as comprising a vehicle hardtop carrier 10 having a head 24 comprising upper and lower plates 20, 22 secured together by threaded fasteners 26, as shown. A longitudinal bar 30 has its forward portion secured between plates 20, 22 by extension of the threaded fastener 26 therethrough through an opening therein and into threaded engagement in lower plate 22, as shown. Front wheel bars 16, 18 have rear end portions pivotally mounted between head plates 20, 22, as indicated in FIGS. 2 and 3, and extend generally forwardly and laterally, to support a hardtop 23. The bars are pivotally positionable to service positions wherein they accommodate a particular hardtop to be carried, between their retracted positions of FIG. 3 and their extended service positions of FIGS. 1 and 2 and their retracted positions of FIG. 3 for carrying and storage.

The bars 16, 18 are retained in selected position by finger-ring pins 14, such pin being shown in FIG. 2, each pin extending through upper plate 20, through a wheel bar into an opening in lower plate 22. The pins 14 are removable and insertable relative to openings 12 by manual engagement with their ring portions for retaining the front wheel bars 16, 18 against undesired movement from their service positions, and to enable movement to the retracted storage positions of FIG. 3, as will be understood from the geometry of the parts.

A rear wheel bar 32 is secured to a rear portion of the longitudinal bar 30 by its engagement in a groove in the rearward end portion of bar 30 secured by threaded fastener 34. Ground support wheels 47, 49 are mounted at opposite ends of the rear wheel bar 32.

In utilizing the carrier, for handling and transporting a particular vehicle hardtop, commencing with the carrier in its folded, compact way of FIG. 3, pins 14 are manually pulled from their openings by means of the finger rings thereon, thereby releasing front wheel bars 16, 18 to pivot to their extended service positions indicated in FIG. 1, with wheels 45 thereon supporting the hardtop.

A cross-member 36 is secured in selected threaded openings 43 of longitudinal bar 30 by threaded fasteners 42 and has therein openings 38 in which are mounted inclined support rods 46 at the outer ends of which is mounted, as by welding, a cushion bar 44 at the end of which is disposed a cushion member 48, as shown. The forward inclination of the rods 46 serves to distribute the load imposed on cushions 48 by a hardtop, as well as facilitating engagement and support of a glass window of the hardtop. Inclined rods transfer load rearwardly of the apparatus to distribute load to the rear wheels.

The hardtop is also supported by resilient bumpers 50 mounted in upper end portions of the front wheel bars 16, 18, thus to prevent scratching or damage to the hardtop.

An elongated fabric strap 52 extends through a slot 54 adjacent to the end of longitudinal bar member 30 and the rear wheels bar 32. As shown, this strap extends upwardly about the vehicle hardtop and downwardly on the opposite side of the hardtop into engagement with the rearward end portion of longitudinal bar 30, thus to retain the hardtop on the carrier. The strap is adjustable in length by means of a buckle (FIG. 2), Velcro fasteners (not shown), or other means. The carrier and hardtop may be lifted by the strap for transport over obstacles, such as a curb.

To accommodate various different hardtops, cross-member 36 which supports the cushion bar 44, is selectively positionable along longitudinal bar 30 by threaded engagement of threaded fasteners 42, which secure member 36, into threaded engagement in selected ones of the threaded openings along longitudinal bar members 30, thus to position cushion members 48 in selected positions forwardly to support particular hardtops. Such positioning of the cross-member 36 along longitudinal bar member 30, is typically accomplished at the time of the initial preparation for the use of the carrier with a particular hardtop of an owner's vehicle, after which no further change or adjustment is required for use of the carrier with the particular hardtop of the owner's vehicle.

It will be understood that various changes and modifications may be made from the preferred embodiments discussed above without departing from the scope of the present invention, which is established by the following claims and equivalents thereof.

What is claimed is:

1. A vehicle hardtop carrier, comprising:
   a generally elongated mounting member having forward and rear ends,
   a head on the forward end portion of the mounting member,
   a pair of front wheel bars extending generally forwardly and oppositely outwardly from the head to support a hardtop, said bars having ground wheels at their outer end portions,
   an adjustable continuous loop retaining strap threaded through an opening in the rear portion of the mounting member and extending about the hardtop to retain the hardtop to prevent the hardtop from swiveling on the carrier, said strap being adjustable in length to accommodate different hardtops,
   a rear wheel bar secured generally transversely on a rear portion of the generally elongated mounting member, said rear wheel bar having ground wheels at its opposite ends, and
   a support bar having at least one contact member thereon and being supported by at least one rod extending generally upwardly from the mounting member to support a hardtop.

2. A vehicle hardtop carrier comprising:
   a generally elongated mounting member having forward and rear ends,
   a head on the forward end portion of the mounting member,
   a pair of front wheel bars extending generally forwardly and oppositely outwardly from the head to support a hardtop, said bars having ground wheels at their outer end portions,
   a rear wheel bar secured generally transversely on a rear portion of the generally elongated mounting member, said rear wheel bar having ground wheels at its opposite ends,
   a support bar having at least one contact member thereon and being supported by at least one rod extending generally upwardly from the mounting member to support a hardtop,
   said head comprises two plates secured in spaced-apart relation by threaded fasteners on top and bottom sides of a forward portion of said mounting member, and
   the front wheel bars are pivotally mounted relative to said plates.

3. A carrier according to claim 2, and further including:
   an adjustable loop retaining strap threaded through an opening in the rear portion of the mounting member and extending about the sides and top of the hardtop to retain the hardtop from swiveling on the carrier, said strap being adjustable in length to accommodate different hardtops.

4. A carrier according to claim 2, and further comprising:
   pins extending through registering openings in said two plates and in the front wheel bars, said pins being manually insertable into and removable from the openings for selective positioning of the wheel bars to accommodate different hardtops.

5. A carrier according to claim 4, wherein said pins have finger loops thereon to facilitate their insertion and removal.

6. A carrier according to claim 2, and further including:
   a retainer bumper extending generally upwardly from end portions of each front wheel bar to engage and retain the hardtop.

7. A vehicle hardtop carrier comprising:
   an elongated mounting member having forward and rear ends,
   a head on the forward end portion of the mounting member, said head comprising two plates secured in spaced-apart relation by threaded fasteners on opposite sides of the forward end portion of said mounting member,
   a pair of front wheel bars extending generally forwardly and oppositely outwardly from the head to support a hardtop, said bars having wheels at their outer end portions, the front wheel bars being pivotally mounted relative to said plates,
   a rear wheel bar secured generally transversely on a rear portion of the mounting member, said rear wheel bar having ground wheels at its opposite ends,
   a cushion bar being supported by at least one rod extending generally upwardly and forwardly from said mounting member to support the hardtop, and further including
   a cushion member at at least one end of the cushion bar.

8. A vehicle hardtop carrier, comprising:
   an elongated mounting member having forward and rear ends,
   a head on the forward end portion of the mounting member,
   a pair of front wheel bars extending generally forwardly and oppositely outwardly from the head to support a hardtop, said bars having wheels at their outer end portions,
   a cushion member extending generally upwardly from end portions of each front wheel bar to engage and support the hardtop,
   a rear wheel bar secured generally transversely on a rear portion of the mounting member, said rear wheel bar having ground wheels at its opposite ends,
   a cushion bar having at least one cushion member thereon and being supported by at least one rod extending generally upwardly from the mounting member to support the hardtop, and
   a cross member secured transversely to the mounting member and having openings therein to mount said at least one rod.

9. A vehicle hardtop carrier, comprising:
   an elongated mounting member having forward and rear ends,
   a head on the forward end portion of the mounting member,
   a pair of front wheel bars extending generally forwardly and oppositely outwardly from the head to support a hardtop, said bars having wheels at their outer end portions, said front wheel bars being pivotally adjustable into positions to accommodate different respective hard tops,
   a cushion member extending generally upwardly from end portions of each of said front wheel bars to engage and support the hardtop,
   a rear wheel bar secured generally transversely on a rear portion of the mounting member, said rear wheel bar having ground wheels at its opposite ends,
   a cushion bar having at least one cushion member thereon and being supported by at least one rod extending generally upwardly from the mounting member to support the hardtop, and a cross member secured transversely of the mounting member and having openings therein to mount said at least one rod.

10. A vehicle hardtop carrier, comprising:

an elongated mounting member having forward and rear ends, a head on the forward end portion of the mounting member, a pair of front wheel bars extending generally forwardly and oppositely outwardly from the head to support a hardtop, said bars having wheels at their outer end portions, a rear wheel bar secured generally transversely on a rear portion of the mounting member, said rear wheel bar having ground wheels at its opposite ends, a cushion bar having at least one cushion member thereon and being supported by at least one rod extending generally upwardly from the mounting member to support the hardtop, said cushion bar being supported by two rods extending generally upwardly and forwardly from said mounting member to support the hardtop, a cushion member mounted at each end of the cushion bar, and a cross member secured transversely of the mounting member and having openings therein to mount said at least one rod.

11. A vehicle hardtop carrier comprising:

an elongated horizontal mounting member having forward and rearward ends, a head on a front end portion of the mounting member and comprising two plates secured in spaced-apart relation on the upper and bottom sides of the mounting member and secured by threaded fasteners, a pair of front wheel bars secured to and extending generally forwardly and oppositely outwardly from the head to support a hardtop, supporting ground wheels on outer end portions of the front wheel bars, pins extending through registering openings in said two plates of the head and in the front wheel bars, the pins being insertable into and removable from the openings for selective positioning of the front wheel bars to an extended service position or a retracted position for carrying and storage, and a rear wheel bar secured transversely on a rear portion of the mounting member and having ground wheels at its opposite ends.

12. A carrier according to claim 11, and further including:

an adjustable loop retaining strap threaded through an opening in the rear portion of the horizontal elongated mounting member and looping about the sides and top of the hardtop to hold the hardtop and prevent the hardtop from swiveling on the carrier.

13. A carrier according to claim 11, and further including:

a support member comprising a retainer extending generally upwardly from end portions of each front wheel bar to engage and retain the hardtop.

14. A carrier according to claim 11, and further comprising:

a support bar supported by two rods extending generally upwardly and forwardly from said mounting member to support the hardtop.

15. A vehicle hardtop carrier comprising:

an elongated mounting member having forward and rearward ends, a head on a front end portion of the mounting member and comprising two plates secured in spaced-apart relation on opposite sides of the mounting member and secured by threaded fasteners, a cushion bar supported by two rods extending generally upwardly and forwardly from said mounting member to support a hardtop, a cross member secured transversely of the mounting member and having openings therein to mount said rods, a pair of front wheel bars extending generally forwardly and oppositely outwardly from the head to support the hardtop, supporting ground wheels on outer end portions of the front wheel bars, pins extending through registering openings in said two plates of the head and in the front wheel bars, the pins being insertable into and removable from the openings for selective positioning of the front wheel bars, and a rear wheel bar secured transversely on a rear portion of the mounting member and having ground wheels at its opposite ends.

* * * * *